United States Patent
Schwenke

(10) Patent No.: US 7,567,183 B2
(45) Date of Patent: Jul. 28, 2009

(54) PRINTABLE SENSORS FOR PLASTIC GLAZING

(75) Inventor: Robert Schwenke, Fowlerville, MI (US)

(73) Assignee: Exatec LLC, Wixom, MI (US)

( * ) Notice: Subject to any disclaimer, the term of this patent is extended or adjusted under 35 U.S.C. 154(b) by 198 days.

(21) Appl. No.: 11/327,601

(22) Filed: Jan. 6, 2006

(65) Prior Publication Data

US 2007/0162233 A1 Jul. 12, 2007

(51) Int. Cl.
G08B 21/00 (2006.01)

(52) U.S. Cl. .................. 340/602; 340/604; 324/667; 324/668; 702/52; 702/53; 73/73

(58) Field of Classification Search .................. 340/602, 340/604; 324/644, 664, 667, 668; 702/50–55; 73/73
See application file for complete search history.

(56) References Cited

U.S. PATENT DOCUMENTS

| | | | |
|---|---|---|---|
| 3,696,409 A | | 10/1972 | Braaten |
| 4,797,605 A | * | 1/1989 | Palanisamy ................. 324/689 |
| 4,805,070 A | * | 2/1989 | Koontz et al. ............... 361/286 |
| 4,968,895 A | | 11/1990 | Leclercq |
| 4,970,122 A | | 11/1990 | Palanisamy |
| 5,212,014 A | | 5/1993 | David et al. |
| 5,672,976 A | * | 9/1997 | Egger et al. ................. 324/668 |
| 5,780,718 A | * | 7/1998 | Weber ........................ 73/29.01 |
| 5,999,136 A | | 12/1999 | Winter et al. |
| 6,307,198 B1 | * | 10/2001 | Asakura et al. ........ 250/227.25 |
| 6,542,351 B1 | | 4/2003 | Kwang |
| 6,627,851 B2 | * | 9/2003 | Sangwan et al. ............. 219/203 |
| 6,654,070 B1 | | 11/2003 | Rofe |
| 2003/0001121 A1 | | 1/2003 | Hochstein |
| 2003/0080871 A1 | * | 5/2003 | Schmitt et al. .............. 340/604 |

(Continued)

FOREIGN PATENT DOCUMENTS

CH 679079 A5 12/1991

(Continued)

OTHER PUBLICATIONS

Notice of Allowability for U.S. Appl. No. 11/327,601 Dated Dec. 30, 2008.

(Continued)

*Primary Examiner*—Daniel Wu
*Assistant Examiner*—Hongmin Fan
(74) *Attorney, Agent, or Firm*—Brinks Hofer Gilson & Lione

(57) ABSTRACT

A system for sensing environmental conditions on a window assembly. The system includes a transparent panel and a sensor integrated onto the panel. The sensor being configured to sense environmental changes on the panel. The sensor may comprise conductive inks that are printed onto the window assembly. The window assembly may comprise a plastic panel, such as a multilayer polycarbonate panel such that a portion of the sensor may be located on the one layer of the panel while another portion of the sensor overlaps the first portion on a second layer of the window. The sensor may be a resistive or capacitive sensor and may be configured to detect changes in one or more environmental conditions, such as temperature or moisture. Further, the sensor may be in electrical communication with a controller configured for control various vehicle subsystems based on the sensor.

14 Claims, 3 Drawing Sheets

U.S. PATENT DOCUMENTS

| | | | |
|---|---|---|---|
| 2004/0021453 A1* | 2/2004 | Jessup | 324/71.1 |
| 2004/0119701 A1 | 6/2004 | Mulligan et al. | |
| 2005/0146383 A1 | 7/2005 | Moore et al. | |
| 2006/0145825 A1 | 7/2006 | McCall | |
| 2006/0284724 A1 | 12/2006 | Sept-Einzel et al. | |

FOREIGN PATENT DOCUMENTS

| | | | |
|---|---|---|---|
| DE | 3721659 A1 | 1/1989 |
| EP | 0 451 701 A1 | 4/1991 |
| EP | 1 306 276 A2 | 9/2002 |
| EP | 1 313 166 A1 | 5/2003 |
| EP | 1 366 936 A1 | 12/2003 |
| EP | 1 564 044 A1 | 8/2005 |
| FR | 2 160 389 | 10/1972 |
| FR | 2160389 | 10/1972 |
| WO | WO 99/58795 | 11/1999 |
| WO | WO 99/66588 | 12/1999 |
| WO | WO 2005/024159 A | 3/2005 |

OTHER PUBLICATIONS

U.S. Appl. No. 11/358,526 Final Office Action dated Dec. 14, 2007.
Notification of Transmittal of the International Search Report dated Oct. 7, 2007.
European Patent Office Communication Dated Dec. 29, 2008.

* cited by examiner ered to detect changes in one or more environmental conditions, such as, but not limited to, temperature or moisture. When assembled into a vehicle, the sensor is in electrical communication with a controller that is configured to control, based on the sensor's output, various vehicle subsystems, such as a vehicle window wiper, vehicle defroster, or vehicle climate control subsystem.

PRINTABLE SENSORS FOR PLASTIC GLAZING

BACKGROUND

1. Field of the Invention

The present invention generally relates to a system for sensing environmental changes on a window of a vehicle.

2. Description of Related Art

Environmental sensors, such as temperature sensors, are typically mounted within a vehicle compartment. This is done because the sensors typically do not blend with the aesthetics of the vehicle and because designing sensors that conform to the appearance of each vehicle would require additional cost, inventory, and create manufacturing problems that are highly undesirable. However, mounting sensors within the occupant compartment can affect their performance and accuracy.

One aspect that makes a commercial sensor not blend with the aesthetics of the vehicle is the mounting required to attach the sensor to the vehicle. In addition, the space requirements and integrity of electrical connections of a commercially produced sensor may not be adequate for the harsh automotive environment.

In view of the above, it is apparent that there exists a need for an improved system for sensing environmental changes on a window.

SUMMARY

In satisfying the above need, as well as overcoming the enumerated drawbacks and other limitations of the related art, the present invention provides to a system for sensing environmental changes on a window of a vehicle.

The system includes a sensor integrated into the window assembly and configured to sense environmental changes. The sensor may comprise conductive inks that are printed onto the transparent glazing panel of the window assembly. The glazing panel may be a single layer or a multilayer plastic (polycarbonate or other suitable material). The sensor may comprise a resistive or capacitive sensor and may be configured to detect changes in one or more environmental conditions, such as, but not limited to, temperature or moisture. When assembled into a vehicle, the sensor is in electrical communication with a controller that is configured to control, based on the sensor's output, various vehicle subsystems, such as a vehicle window wiper, vehicle defroster, or vehicle climate control subsystem.

In another aspect of the present invention, the sensor may be a resistive-capacitive sensor that is configured to detect a change in one or more environmental conditions. As such, a resistive element and capacitive element are arranged in parallel electrical connection forming a time constant. The controller may detect changes in the time constant to interpret changes in one or more environmental conditions based on the resultant resistive or capacitive change in the sensor.

Further objects, features and advantages of this invention will become readily apparent to persons skilled in the art after a review of the following description, with reference to the drawings and claims that are appended to and form a part of this specification.

DETAILED DESCRIPTION

Figure 1:
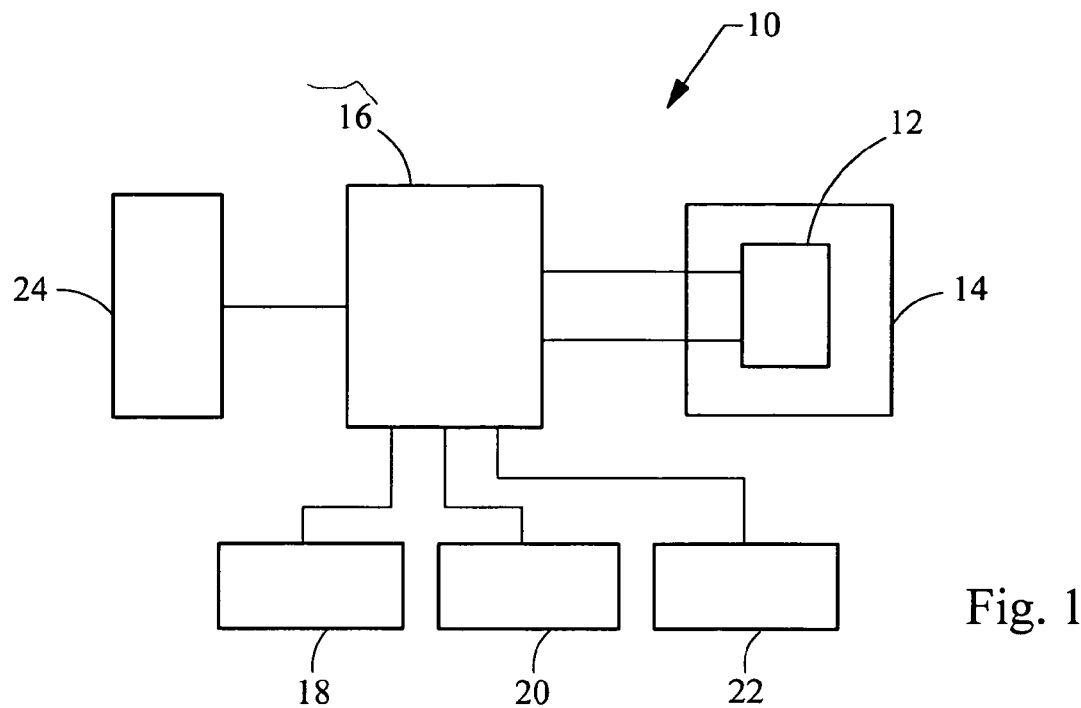
FIG. 1 is a schematic view of a system for sensing environmental changes on a window in accordance with one embodiment of the present invention.

Referring now to FIG. 1, a system embodying the principles of the present invention is illustrated therein and designated at 10. The system 10 includes a sensor 12 integrated with a glazing panel of a window assembly 14 and in electrical communication with a controller 16. The sensor 12 may be a temperature sensor, a moisture sensor, or other sensor for detecting environmental changes on the window 14. As such, the sensor 12 may produce a change in resistance, capacitance, or other electrical property that may be detected by the controller 16 in response to one or more environmental changes.

The window assembly 14 may comprise a common, transparent glass panel. Although, preferably the window assembly 14 comprises a transparent plastic panel, for example a polycarbonate panel. Accordingly, the sensor 12 may be printed or applied to the panel using known techniques and a conductive ink or conductive polymer, such as those known in the industry for being applied to glass or plastic panels. Various materials may be used based on the particular application. An example of a conductive ink includes metallic pigmented inks comprising pigments of silver, copper, zinc, aluminum, magnesium, nickel, tin, silicon, or mixtures and alloys of the like. Examples of conductive polymers include but are not limited to polyaniline and polythiophene (i.e., Baytron® polymers, H.C. Starck GmbH, Germany).

Other materials could include conductive films. Conductive films may comprise but not be limited to indium tin oxide (ITO), indium doped zinc oxide (IZO), and aluminum doped zinc oxide. Conductive films may be applied to the transparent panel by any suitable technique known to those skilled in the art, including but not limited to vacuum deposition processes, such as plasma enhanced chemical vapor deposition, ion assisted plasma deposition, magnetron sputtering, electron beam evaporation, and ion beam sputtering. Further, any traces, pads, resistive elements or capacitive elements later described herein may be formed from such conductive pigmented ink, conductive polymer, or conductive film.

The window assembly may further comprise opaque regions such as a frame as obtained via printing an ink on the panel or through the use of a two-shot molding process. Other opaque regions may comprise fade-out dots, logos, and the like. In a two-shot molding process, the opaque second shot of plastic resin may be of a similar or different plastic resin composition than the first transparent shot of resin. The transparent resin may further comprise additives, such as colorants to tint the panel to a desired color.

The controller 16 provides a current or voltage signal to the sensor 12. As environmental conditions proximate the window assembly 14 change, electrical property changes will occur in the sensor 12 that affect driving signal provided by the controller 16. The controller 16 then interprets the effects on the driving signal to determine the particular environmental change that has caused an electrical property change in the sensor 12.

The controller 16 may use information about the environmental change to control other vehicle subsystems. For example, if the sensor 12 is a moisture sensor, the controller 16 may control the windshield wiper system 18 to activate the wipers, increase the speed of the wipers, or decrease the speed of the wipers based on the sensor 12. In a similar example, the controller 16 may be used to control a vehicle defroster subsystem 20. As such, the sensor 12 may be a moisture sensor, a temperature sensor, or both. Accordingly, the controller 16 may activate a defroster associated with the window 14, increase defrosting, or decrease defrosting based on the sensor 12.

In yet another example, the controller 16 is in electrical communication with a climate control subsystem 22. As in the previous examples, the controller 16 may activate the climate control system, increase heating or cooling, decrease heating or cooling, or make other climate changes based on the sensor 12. In addition, the controller 16 may be in communication with a vehicle control system 24, such as a suspension system, antilock braking system, or safety system (airbag, passenger restraint, or other). Accordingly, the controller 16 may be configured to control the vehicle control system 24, including, but not limited to, all of the above-mentioned variations, based on the environmental changes detected by the sensor 12.

Figure 2:
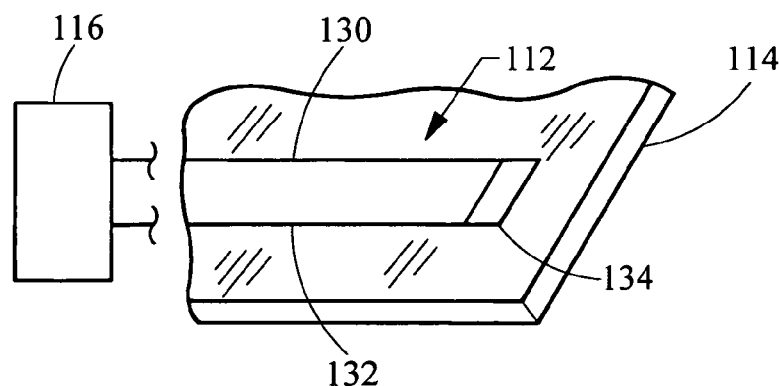
FIG. 2 is a schematic view of a resistive system for sensing environmental changes on a window.

Now referring to FIG. 2, the sensor 112 is shown therein as a resistive temperature sensor. The sensor 112 is applied to a surface of the glazing panel of the window assembly 114. The sensor 112 may be printed on an exposed surface of the window assembly 114 or in-between two layers of the window assembly 114, for example in the case of a multilayer polycarbonate panel, under one or more protective layers applied to the main panel. The controller 116 is in electrical connection with a first trace 130, also made of a conductive ink. Trace 130 connects the controller 116 to the first side of a resistive element 134, which is made of a conductive material that is configured to change resistance based on a change of temperature in the window assembly 114 and sensor 112. Similar to the traces, the resistive element 134 may be made of a conductive ink and printed onto a surface of the window assembly 114 as suggested above. Accordingly, a second trace 132 completes the circuit connecting a second side of element 134 to the controller 116. As such, the controller 116 provides a driving signal that travels along trace 130, through element 134, and returns to the controller 116 through trace 132. By measuring any change in the driving signal (voltage or current) caused by the element 134, the controller 116 may determine the temperature or change in temperature of the environment surrounding the sensor 112 and window assembly 114.

Figure 3:
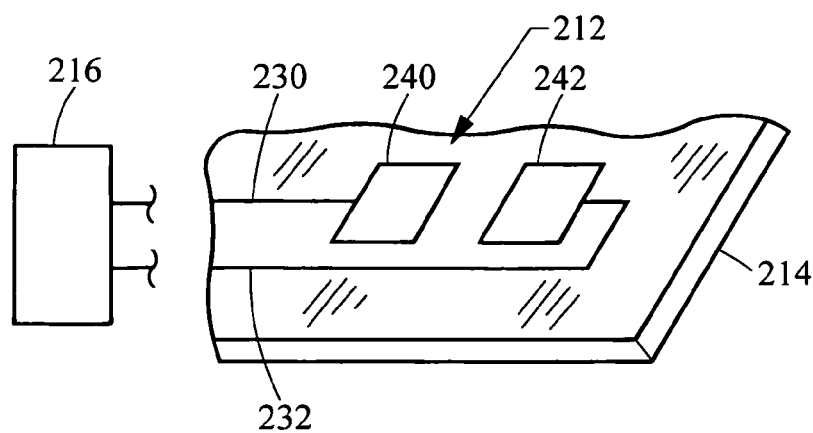
FIG. 3 is a schematic view of a capacitive system for sensing environmental changes on a window.

Now referring to FIG. 3, the sensor 212 is shown as a capacitive sensor. Traces 230 and 232 are provided to electrically connect the controller 216 to the sensor 212 and have the same variations as described above. The sensor 212 includes a first pad 240 and a second pad 242. The first and second pad 240, 242 may be located on a surface of the window assembly 214, such as a polycarbonate panel, adjacent to one another. In addition, for a multilayer polycarbonate panel, the pads 240 and 242 may be located on separate layers and even overlapped to provide a greater capacitive surface area thereby increasing the sensitivity of the sensor 212. Accordingly, the first trace 230 is connected to the first pad 240 and second trace 232 is connected to the second pad 242. As such, the controller 216 provides a driving signal that travels along trace 230, through the capacitive element formed by the first and second pad 240, 242, and returns through trace 232. The controller 216 is configured to measure changes in voltage or current across the first and second pad 240, 242, so as to detect and interpret environmental changes surrounding the sensor 212 and window assembly 214.

Figure 4:
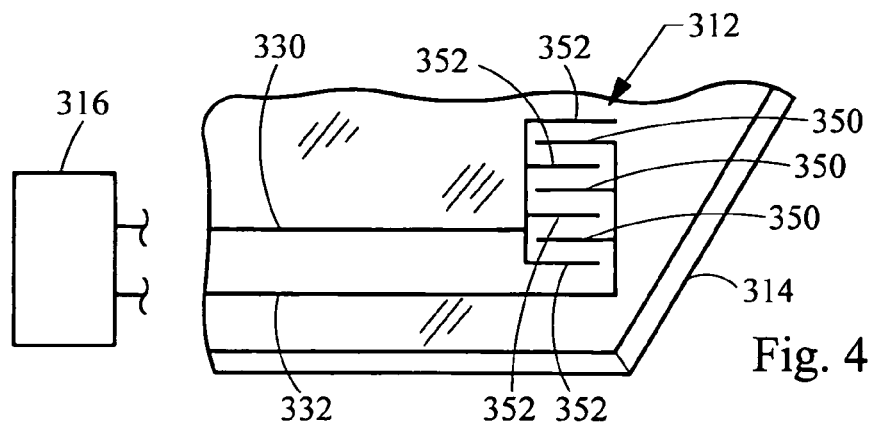
FIG. 4 is a schematic view of another capacitive system for sensing environmental changes on a window.

Now referring to FIG. 4, another embodiment of a capacitive sensor is provided. Traces 330 and 332 are provided to electrically connect the controller 316 to the sensor 312 and have the same variations as described above. The sensor 312 includes a first series of traces 350 and a second series of traces 352 that form a mating pattern 354 of alternating traces. The first and second series of traces 350, 352 may be located on a surface of the window assembly 314, as noted above. Further, the window assembly 314 may be a multilayer polycarbonate panel, such that the first series of traces 350 may be located on a separate layer from the second series of traces 352, thereby providing insulation between the two series of traces 350, 352. In addition, the first and second series 350, 352 may overlap to improve the capacitive effect, if located on separate layers of the polycarbonate panel. As with the prior embodiment, the controller 316 is configured to measure the change in voltage or current across the mating pattern 354, or more specifically the first and second series of trace 350, 352, to detect and interpret the environmental conditions, and any change surrounding the sensor 312 and window assembly 314.

Figure 5:
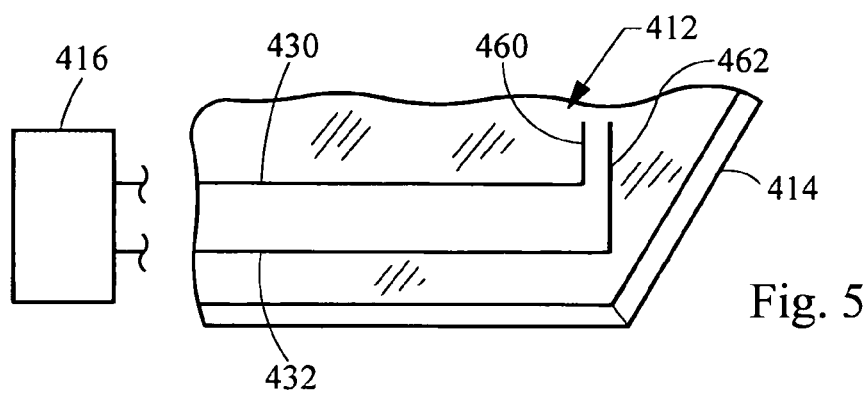
FIG. 5 is a schematic view of another capacitive system for sensing environmental changes on a window.

Now referring to FIG. 5, another embodiment of a capacitive sensor is provided. Traces 430 and 432 are provided to electrically connect the controller 416 to the sensor 412 and have the same variations as described above. The sensor 412 includes a first trace 460 and a second trace 462 located in close parallel proximity to one another on the window assembly 414. Further, the window assembly 414 is a multilayer polycarbonate panel, such that the first and second trace 460, 462 may be located on separate layers of the window assembly 414, thereby providing insulation between the first and second trace 460, 462. In such a construction, the first and second traces 460, 462 may overlap thereby improving visibility through the window and increasing the capacitive surface area to improve the capacitive effect. Again, the controller 416 is configured measure the change in voltage or current across the first and second traces 460, 462 so as to detect and interpret the environmental change surrounding the sensor 412 and window assembly 414.

Figure 6:
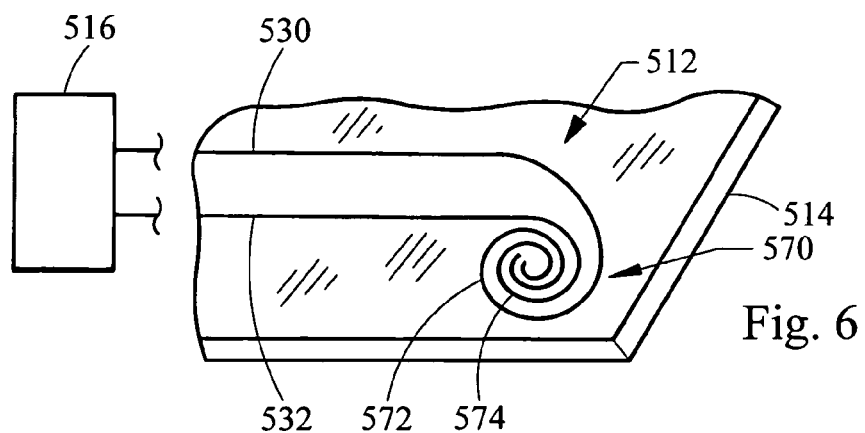
FIG. 6 is a schematic view of yet another capacitive system for sensing environmental changes on a window.

Now referring to FIG. 6, yet another capacitive sensor is provided. Traces 530 and 532 are provided to electrically connect the controller 516 to the sensor 512 on the window assembly 514 and have the same variations as described above. The sensor 512 includes a first trace 572 and a second trace 574 that form a spiral pattern 570. Throughout the spiral pattern 570, the first and second trace 572, 574 may be substantially maintained equidistantly apart or may have varying distances based on the geometry of the spiral pattern 570. The spiral pattern 570 may be ovoid or even circular, thereby providing improved capacitance and reduced pattern size on the window assembly 514. As described above, the first and second trace 572, 574 may be located on separate layers of the window assembly 514 and overlap one another. The controller 516, as in the previous embodiments, is configured to measure the change in capacitance of across the first and second trace 572, 574 to detect the environmental conditions or change in those conditions.

Figure 7:
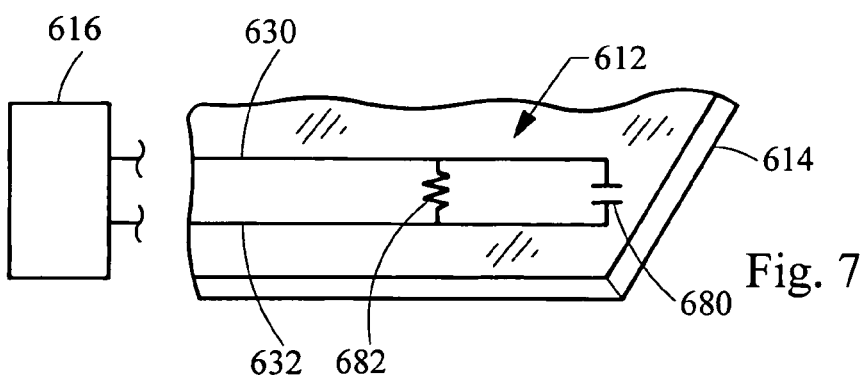
FIG. 7 is a schematic view of a resistive-capacitive (RC) system for sensing environmental changes on a window.

Now referring to FIG. 7, a resistive-capacitive circuit is provided. Traces 630 and 632 are provided to electrically connect the controller 616 to the sensor 612 on the window assembly 614 and have the same variations as described above. The sensor 612 includes a resistive element 682 and a capacitive element 680. For clarity, the resistive and capacitive elements 682, 680 are shown in schematic form. Further, the resistive and capacitive elements, 682, 680 are provided in an electrically parallel connection. As such, the resistive and capacitive elements 682, 680 may be configured to change resistive and/or capacitive properties based on a single environmental parameter, or multiple environmental parameters. For example, the controller 616 may provide a pulsed signal that may be affected by the time constant generated by the combination of the resistive element 682 and capacitive element 680. Accordingly, the controller 616 may sense the change in time constant to determine the environmental conditions or a change in the same. In one embodiment, the resistive element 682 may be sensitive to temperature while the capacitive element 680 may be constant or also sensitive to temperature. In another embodiment, the resistive element 682 may be sensitive to temperature while the capacitive element 680 may be sensitive to moisture, thus providing an output that changes with respect to multiple environmental conditions, namely temperature and moisture in this example. As such, the controller 616 may interpret the affect of the time constant on the signal to extract information separately about the moisture and temperature changes sensed by the sensor 612.

Figure 8:
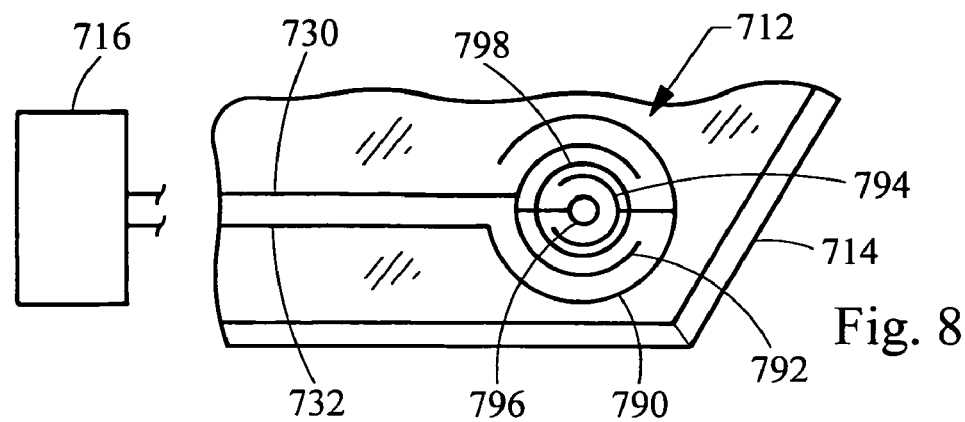
FIG. 8 is a schematic view of another RC system for sensing environmental changes on a window.

Now referring to FIG. 8, another embodiment of the resistive-capacitive sensor 712 is provided. Traces 730 and 732 are provided to electrically connect the controller 716 to the sensor 712 on the window assembly 714 and have the same variations as described above. The sensor 712 includes a first series of traces 790 mating with a second series of traces 792 and thereby providing a capacitive element. In addition, a resistive element 798 is attached between a first portion 794 of the first series of traces 790 and a second portion 796 of the second series of traces 792. As such, the first and second series of traces 790, 792, along with the resistive element 798, form a resistive-capacitive sensor as generally described above in connection with FIG. 7. Further, the mating pattern formed by the first and second series of traces 790, 792 has a generally circular shape wherein the first and second series 790, 792 form interfitting rings, for example alternating concentric rings, to enhance the capacitive effects of the sensor 712.

Figure 9:
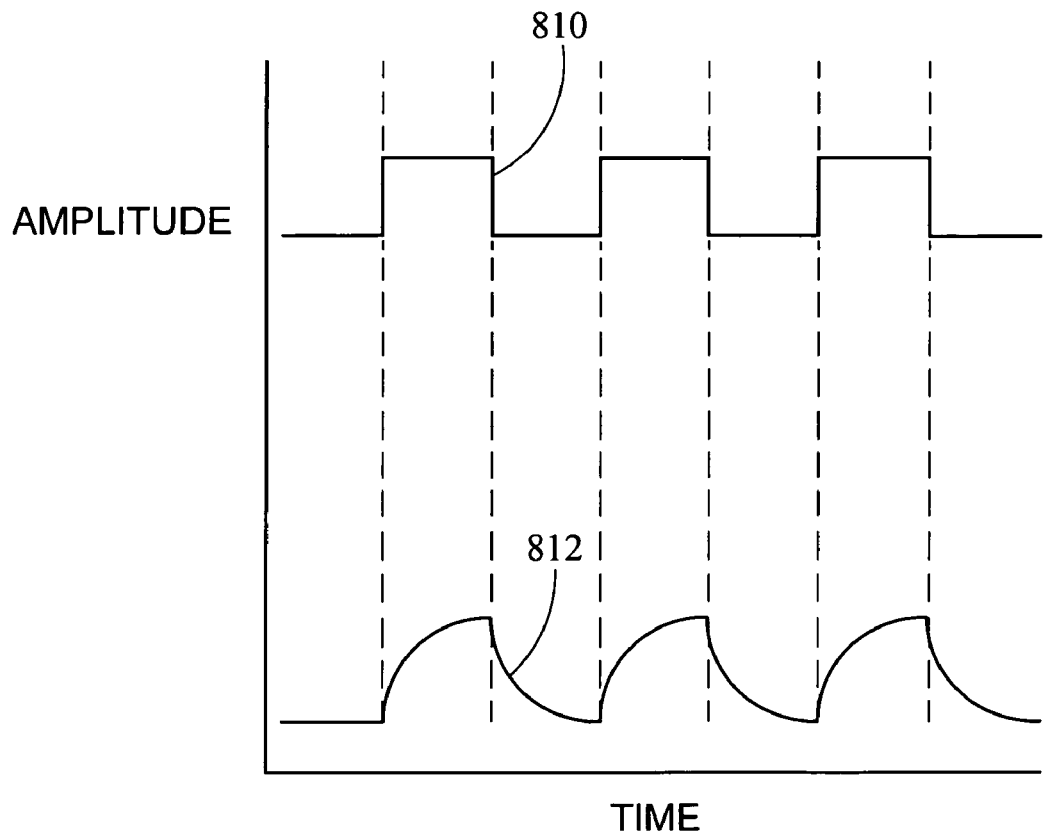
FIG. 9 is a graph illustrating the input and output signal of a RC system for sensing environmental changes on a window.

Now referring to FIG. 9, a graph illustrating the driving signal and the affect of the RC time constant, as mentioned with regard to FIGS. 7 and 8, is provided. The driving signal 810 is provided from the controller 16, for example by a pulse width modulator. Obviously, the frequency and duty cycle of the driving signal may vary based on the application. Using a high frequency driving signal may provide easier conductivity adaptations between the controller 16 and the sensor 12 and may enhance the capacitive nature of the sensor 12. Although decreasing the frequency of the driving signal 810 may allow for increase sampling of the resulting signal 812 and provide for increased resolution in determining the capacitive and resistive changes corresponding to the environmental changes. As seen in the figures, the resulting signal 812 has a waveform with a frequency and duty cycle corresponding to the driving signal 810. However, the RC time constant formed by the resistive and capacitive element of the sensor 12 creates a generally saw-tooth wave based on the resistive and capacitive electrical parameters of sensor 12. As such, the shape of the rising and falling curved portions of the saw-tooth waveform will change in curvature based on changes in the environmental parameters around the sensor 12 and window 14, according to the resultant resistive and capacitive changes in the sensor 12.

As a person skilled in the art will readily appreciate, the above description is meant as an illustration of implementating the principles of this invention. This description is not intended to limit the scope or application of this invention in that the invention is susceptible to modification, variation and change, without departing from the spirit of this invention, as defined in the following claims.

I claim:

1. A window assembly for a vehicle, the window assembly comprising:

a multilayer polycarbonate panel of the vehicle;

a sensor formed of a conductive ink printed onto the multilayer polycarbonate panel to form a plurality of traces and configured to sense environmental changes, wherein a first portion of the sensor is located on a first layer of the multilayer polycarbonate panel and a second portion of the sensor is located on a second layer of the multilayer polycarbonate panel, a first portion of the plurality traces forming a resistive element and a second portion of the plurality of traces forming a capacitive element, the resistive element and capacitive element being in parallel electrical connection, the resistive element and capacitive element forming a time constant and affecting a driving signal based on the time constant;

a controller configured to sense the change in time constant to detect a change in the environmental conditions.

2. The window assembly according to claim 1, wherein the sensor comprises a temperature sensor.

3. The window assembly according to claim 1, wherein the sensor comprises a moisture sensor.

4. The window assembly according to claim 1, wherein the sensor is configured to change resistance based on the environmental changes.

5. The window assembly according to claim 1, further comprising a controller in electrical communication with the sensor and configured to control a vehicle window wiper based on the sensor.

6. The window assembly according to claim 1, further comprising a controller in electrical communication with the sensor and configured to control a vehicle defroster based on the sensor.

7. The window assembly according to claim 1, further comprising a controller In electrical communication with the sensor end configured to control a vehicle climate control subsystem based on the sensor.

8. The window assembly according to claim 1, wherein the sensor comprises a capacitive sensor.

9. The window assembly according to claim 1, wherein the sensor includes a first trace and a second trace, each trace being in electrical communication with a pad, where the pad has a width greater than the width of the trace.

10. The window assembly according to claim 1, wherein the plurality of traces form an interfitting pattern.

11. The window assembly according to claim 1, wherein the plurality of traces form a spiral pattern.

12. The window assembly according to claim 1, wherein the first portion of the sensor on the first layer of the multilayer polycarbonate panel overlaps with the second portion of the sensor located on the second layer of the multilayer polycarbonate panel.

13. The window assembly according to claim 1, wherein the first portion and second portion are located under one or more protective layers of the multilayer polycarbonate panel.

14. The window assembly according to claim 1, wherein the controller is configured to extract information separately about resistive changes and capacitive changes of the sensor.

* * * * *

UNITED STATES PATENT AND TRADEMARK OFFICE
CERTIFICATE OF CORRECTION

| | | |
|---|---|---|
| PATENT NO. | : 7,567,183 B2 | Page 1 of 1 |
| APPLICATION NO. | : 11/327601 | |
| DATED | : July 28, 2009 | |
| INVENTOR(S) | : Robert Schwenke et al. | |

It is certified that error appears in the above-identified patent and that said Letters Patent is hereby corrected as shown below:

In column 6, claim 7, line 41, after "comprising a controller" replace "In" with --in--.

Signed and Sealed this

Twenty-seventh Day of October, 2009

David J. Kappos
*Director of the United States Patent and Trademark Office*